US011639191B2

(12) United States Patent
Ogata et al.

(10) Patent No.: US 11,639,191 B2
(45) Date of Patent: May 2, 2023

(54) TURNING APPARATUS

(71) Applicant: JTEKT CORPORATION, Osaka (JP)

(72) Inventors: Toshiaki Ogata, Okazaki (JP); Fumio Kishida, Toyota (JP); Yoshio Kondo, Okazaki (JP); Keishi Nakamura, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 219 days.

(21) Appl. No.: 17/155,170

(22) Filed: Jan. 22, 2021

(65) Prior Publication Data

US 2021/0229736 A1    Jul. 29, 2021

(30) Foreign Application Priority Data

Jan. 29, 2020   (JP) .............................. JP2020-012577

(51) Int. Cl.
*B62D 5/04*        (2006.01)
*B62D 6/00*        (2006.01)

(52) U.S. Cl.
CPC ......... *B62D 5/0463* (2013.01); *B62D 5/0448* (2013.01); *B62D 6/00* (2013.01)

(58) Field of Classification Search
CPC ....... B62D 5/0463; B62D 5/0448; B62D 6/00
See application file for complete search history.

(56) References Cited

U.S. PATENT DOCUMENTS

| | | | | |
|---|---|---|---|---|
| 6,691,819 B2* | 2/2004 | Menjak | .................. | B62D 6/003 701/41 |
| 7,500,537 B2* | 3/2009 | Itoh | ........................ | B62D 5/003 180/405 |
| 8,789,647 B2* | 7/2014 | Hwang | ..................... | F16D 3/48 180/444 |
| 9,079,604 B2* | 7/2015 | Di Giusto | .............. | B62D 5/046 |
| 2005/0072621 A1* | 4/2005 | Hara | ...................... | B62D 1/163 180/444 |
| 2005/0257992 A1* | 11/2005 | Shiino | ...................... | B62D 5/04 180/444 |
| 2006/0055139 A1* | 3/2006 | Furumi | .................... | B62D 5/04 280/93.513 |
| 2006/0278466 A1* | 12/2006 | Cheng | .................... | B62D 5/046 180/444 |
| 2015/0298722 A1* | 10/2015 | Witte | ................... | B62D 5/0421 180/407 |
| 2015/0360715 A1* | 12/2015 | Shimizu | ................ | F16D 41/064 701/43 |
| 2018/0043927 A1* | 2/2018 | Asakura | .................. | F16H 35/18 |
| 2018/0281846 A1* | 10/2018 | Schreiner | ............. | B62D 5/0463 |
| 2021/0053615 A1* | 2/2021 | Kondo | ................... | B62D 5/001 |

FOREIGN PATENT DOCUMENTS

JP          6429224 B1     11/2018

* cited by examiner

*Primary Examiner* — Jacob D Knutson
(74) *Attorney, Agent, or Firm* — Oliff PLC

(57) ABSTRACT

A turning apparatus includes tie rods, a wheel turning shaft, two motors, two ball screws, a transmission mechanism, and two controllers. The wheel turning shaft turns steered wheels of a vehicle. A first controller that is any one of the two controllers computes a current command value and allocates the current command value to the motors at a ratio that varies with a position of the wheel turning shaft in an axial direction. The two controllers each supply any one of the motors, which is an object to be controlled by a corresponding one of the controllers, with a current according to a corresponding of individual current command values.

4 Claims, 6 Drawing Sheets

FRONT VIEW

PLAN VIEW

PLAN VIEW

TURNING APPARATUS

CROSS-REFERENCE TO RELATED APPLICATION

This application claims priority to Japanese Patent Application No. 2020-012577 filed on Jan. 29, 2020, incorporated herein by reference in its entirety.

BACKGROUND

1. Technical Field

The disclosure relates to a turning apparatus that turns steered wheels of a vehicle.

2. Description of Related Art

A so-called steer-by-wire steering apparatus in which power transmission between a steering wheel and steered wheels is mechanically separated is known. For example, in a steering apparatus of Japanese Patent No. 6429224 (JP 6429224 B), two motors are respectively coupled via speed reduction mechanisms to a wheel turning shaft for turning steered wheels. Each speed reduction mechanism includes a ball screw for converting the rotating motion of the motor to the linear motion of the wheel turning shaft. The ball screw is made up of a ball screw groove portion on the wheel turning shaft and a ball nut screwed to the ball screw groove portion via a plurality of balls.

SUMMARY

Both ends of the wheel turning shaft are respectively coupled to the steered wheels via tie rods, and each of the tie rods is provided at a predetermined angle with respect to the wheel turning shaft. For this reason, a reverse input load from each steered wheel is decomposed into an axial load acting in a direction along an axial direction of the wheel turning shaft and a radial load acting in a direction perpendicular to the axial direction of the wheel turning shaft.

Each ball screw is a machine element that affects an axial load, that is, a machine element that generates thrust along the axial direction, so the ball screw basically has no structure of receiving a radial load. For this reason, when a radial load acts on the ball screw, a load may concentrate on part of the balls or ball screw groove to deteriorate product service life.

The disclosure maintains and improves product service life.

An aspect of the disclosure relates to a turning apparatus. The turning apparatus includes: tie rods respectively coupled to steered wheels of a vehicle; a wheel turning shaft at both ends of which the tie rods are respectively swingably coupled at angles; two motors configured to generate a torque that is a source of a driving force to be applied to the wheel turning shaft; two ball screws each configured to individually convert rotating motion of a corresponding one of the two motors to linear motion of the wheel turning shaft; a transmission mechanism configured to transmit a torque of each of the motors to a corresponding one of the ball screws; and two controllers each configured to individually control a corresponding one of the two motors. The wheel turning shaft is configured to linearly move in an axial direction to turn the steered wheels of the vehicle via the tie rods. The two ball screws respectively have external thread grooves disposed at different positions in the axial direction on an outer periphery of the wheel turning shaft. A first controller that is any one of the two controllers is configured to compute a current command value according to a total value of torque to be generated by the two motors and configured to allocate the computed current command value to the motors at a ratio that varies with a position of the wheel turning shaft in the axial direction. The two controllers each are configured to supply any one of the motors, which is an object to be controlled by a corresponding one of the controllers, with a current according to an individual current command value allocated to the any one of the motors, which is the object to be controlled.

Since the tie rods are provided for the wheel turning shaft at angles, a reverse input load from each of the steered wheels is decomposed into an axial load acting in the axial direction of the wheel turning shaft and a radial load acting in a direction perpendicular to the axial direction of the wheel turning shaft. In other words, moment according to the radial load is applied to a corresponding one of both ends of the wheel turning shaft about a corresponding one of the ball screws. The magnitude of the moment varies with an angle formed between the tie rod and the wheel turning shaft, and the angle formed between the tie rod and the wheel turning shaft varies with a position of the wheel turning shaft. In other words, the magnitude of moment about each of the two ball screws varies with a position of the wheel turning shaft.

Since the ball screws are machine elements configured to generate thrust along the axial direction, the ball screws basically do not have a structure of receiving a radial load. For this reason, when a radial load acts on the ball screw, a load on balls and ball screw groove of the ball screw increases, with the result that product service life may decrease.

In this regard, with the above configuration, a current command value computed in accordance with a total torque to be generated by the two motors is allocated to each of the motors at a ratio according to a position of the wheel turning shaft, so it is possible to bring a load on balls and ball screw grooves of the two ball screws close to a uniform state. Therefore, it is possible to maintain and improve the product service life of the ball screws and, by extension, the turning apparatus.

In the turning apparatus, on an assumption of a first predetermined condition, the first controller may be configured to reduce an allocation rate of the current command value to the motor associated with the ball screw on a side where a value of moment is larger and may be configured to increase an allocation rate of the current command value to the motor associated with the ball screw on a side where a value of moment is smaller. The first predetermined condition may include: i) the moment is applied to each of the ends of the wheel turning shaft about a corresponding one of the two ball screws according to a reverse input load from a corresponding one of the steered wheels; and ii) the moment varies with the position of the wheel turning shaft in the axial direction due to swingable coupling of each of the tie rods to a corresponding one of the ends of the wheel turning shaft at an angle.

With the above configuration, the allocation rate of the current command value to the motor associated with the ball screw on a side where the value of moment is larger is reduced, so a load on the motion of the ball screw on a side where the value of moment is larger is reduced. Conversely, the allocation rate of the current command value to the motor associated with the ball screw on a side where the value of moment is smaller is increased, so a load on the motion of the ball screw on a side where the value of moment is smaller is increased. Thus, loads on the motions of the two ball screws are uniformed.

In the turning apparatus, first change characteristics and second change characteristics may have mutually inverse characteristics. The first change characteristics may be change characteristics of an allocation rate of the current command value to the motor associated with a first ball screw against a position change of the wheel turning shaft in the axial direction with respect to a neutral position of the wheel turning shaft. The second change characteristics may be change characteristics of an allocation rate of the current command value to the motor associated with a second ball screw against the position change of the wheel turning shaft in the axial direction with respect to the neutral position of the wheel turning shaft.

With the above configuration, the change characteristics of the allocation rates of the current command value to the motors respectively associated with the two ball screws are inverse against a position change of the wheel turning shaft in the axial direction with respect to the neutral position of the wheel turning shaft, so the allocation rate of the current command value to each of the two motors is easily adjusted.

In the turning apparatus, on an assumption of a second predetermined condition, the first controller may be configured to, as the wheel turning shaft moves with respect to the neutral position, reduce more the allocation rate of the current command value to the motor associated with the ball screw disposed on a side across from a side to which the wheel turning shaft moves and increase more the allocation rate of the current command value to the motor associated with the ball screw on the side to which the wheel turning shaft moves. The second predetermined condition may include such characteristics that, as the wheel turning shaft moves with respect to the neutral position, a value of moment that is applied to the ball screw disposed on the side across from the side to which the wheel turning shaft moves increases.

With the above configuration, the allocation rate of the current command value to each of the two motors is further appropriately set in accordance with a position of the wheel turning shaft. For this reason, it is possible to further minutely adjust a load on the motion of each of the two ball screws in accordance with a position of the wheel turning shaft.

In the turning apparatus, on an assumption of a third predetermined condition, the first controller may be configured to, as the wheel turning shaft moves with respect to the neutral position, reduce more the allocation rate of the current command value to the motor associated with the ball screw disposed on a side to which the wheel turning shaft moves and increase more the allocation rate of the current command value to the motor associated with the ball screw on a side across from the side to which the wheel turning shaft moves. The third predetermined condition may include such characteristics that, as the wheel turning shaft moves with respect to the neutral position, a value of moment that is applied to the ball screw disposed on the side to which the wheel turning shaft moves increases.

With the above configuration, the allocation rate of the current command value to each of the two motors is further appropriately set in accordance with a position of the wheel turning shaft. For this reason, it is possible to further minutely adjust a load on the motion of each of the two ball screws in accordance with a position of the wheel turning shaft.

With the above configuration, it is possible to maintain and improve product service life.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
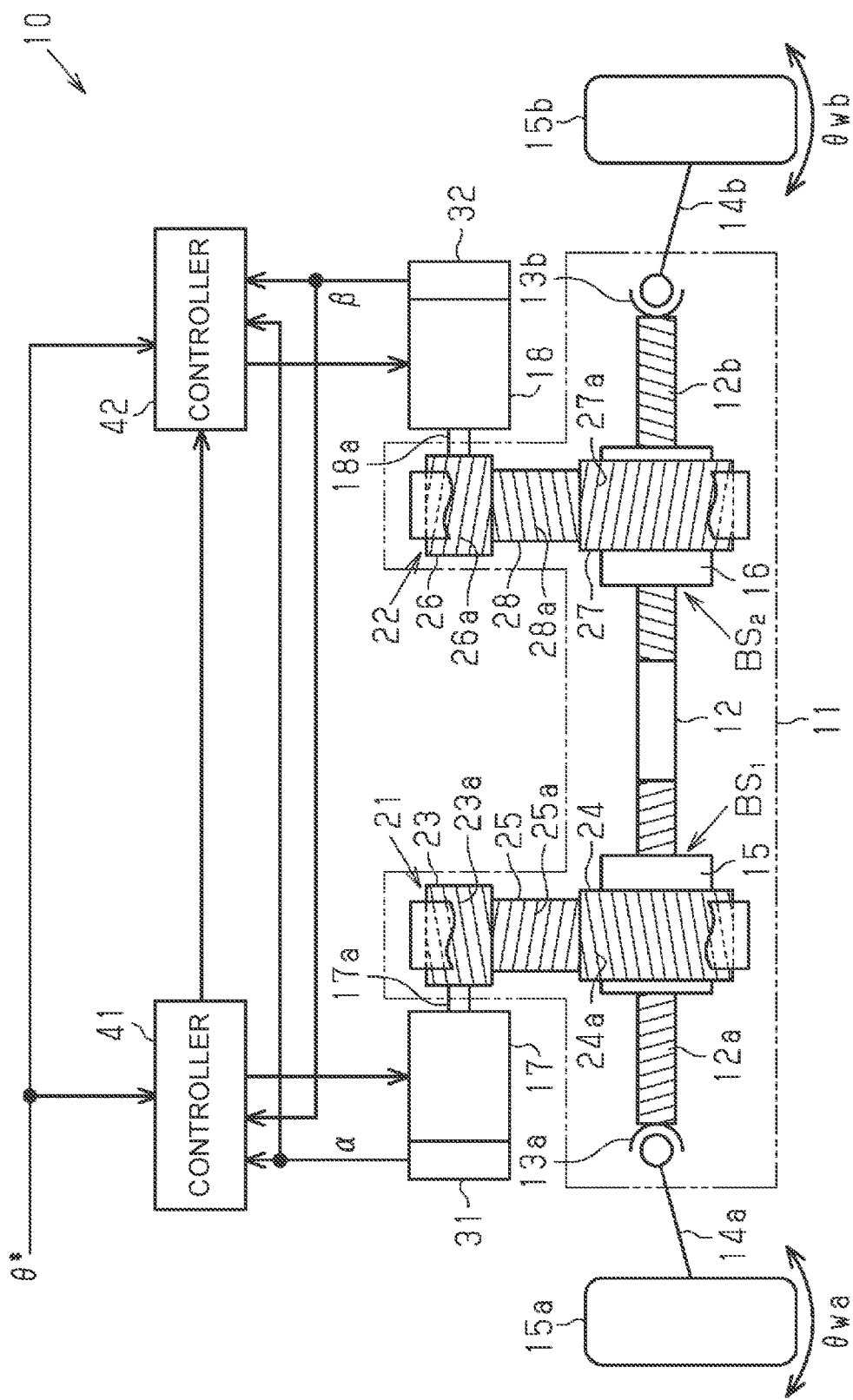
FIG. 1 is a front view of a turning apparatus according to a first embodiment when viewed in a vehicle travel direction.

Hereinafter, a first embodiment that is an example of a turning apparatus of a vehicle will be described. As shown in FIG. 1, a turning apparatus 10 includes a housing 11 fixed to a vehicle body (not shown). A wheel turning shaft 12 is accommodated inside the housing 11. The wheel turning shaft 12 extends along a right and left direction of the vehicle body (right and left direction in FIG. 1). A first tie rod 14a is coupled to a first end (left end in FIG. 1) of the wheel turning shaft 12 via a first inner ball joint 13a. A first steered wheel 15a is coupled to an end of the first tie rod 14a across from the first inner ball joint 13a. A second tie rod 14b is coupled to a second end (right end in FIG. 1) of the wheel turning shaft 12 via a second inner ball joint 13b. A second steered wheel 15b is coupled to an end of the second tie rod 14b across from the second inner ball joint 13b. When the wheel turning shaft 12 moves along its axial direction, a wheel steering angle θwa of the first steered wheel 15a and a wheel steering angle θwb of the second steered wheel 15b are changed.

The wheel turning shaft 12 has a first ball screw groove portion 12a and a second ball screw groove portion 12b. The first ball screw groove portion 12a is a portion at which right-hand thread is provided over a predetermined range adjacent to the first end (left end in FIG. 1) in the wheel turning shaft 12. The second ball screw groove portion 12b is a portion at which left-hand thread is provided over a predetermined range adjacent to the second end (right end in FIG. 1) in the wheel turning shaft 12.

The turning apparatus 10 includes a first ball nut 15 and a second ball nut 16. The first ball nut 15 is screwed to the first ball screw groove portion 12a of the wheel turning shaft 12 via a plurality of balls (not shown). The second ball nut 16 is screwed to the second ball screw groove portion 12b of the wheel turning shaft 12 via a plurality of balls (not shown). The first ball screw groove portion 12a of the wheel turning shaft 12, the balls (not shown), and the first ball nut 15 make up a first ball screw $BS_1$. The second ball screw groove portion 12b of the wheel turning shaft 12, the balls (not shown), and the second ball nut 16 make up a second ball screw $BS_2$.

The turning apparatus 10 includes a first motor 17 and a second motor 18. The first motor 17 and the second motor 18 are sources that generate a wheel steering force that is a power for turning the first steered wheel 15a and the second steered wheel 15b. For example, a three-phase brushless motor is employed as each of the first motor 17 and the second motor 18. The first motor 17 and the second motor 18 are respectively fixed to portions outside the housing 11. An output shaft 17a of the first motor 17 and an output shaft 18a of the second motor 18 extend parallel to the wheel turning shaft 12.

The turning apparatus 10 includes a first belt transmission mechanism 21 and a second belt transmission mechanism 22. The first belt transmission mechanism 21 includes a drive pulley 23, a driven pulley 24, and an endless belt 25. The drive pulley 23 is a synchronous pulley on the outer periphery of which teeth 23a are provided, and is fixed to the output shaft 17a of the first motor 17. The driven pulley 24 is a synchronous pulley on the outer periphery of which teeth 24a are provided, and is fixed so as to be fitted to the outer periphery of the first ball nut 15. The belt 25 is a synchronous belt on the inner periphery of which teeth 25a are provided, and is wound between the drive pulley 23 and the driven pulley 24. Therefore, rotation of the first motor 17 is transmitted to the first ball nut 15 via the drive pulley 23, the belt 25, and the driven pulley 24.

The second belt transmission mechanism 22, as well as the first belt transmission mechanism 21, includes a drive pulley 26, a driven pulley 27, and an endless belt 28. The drive pulley 26 is a synchronous pulley on the outer periphery of which teeth 26a are provided, and is fixed to the output shaft 18a of the second motor 18. The driven pulley 27 is a synchronous pulley on the outer periphery of which teeth 27a are provided, and is fixed so as to be fitted to the outer periphery of the second ball nut 16. The belt 28 is a synchronous belt on the inner periphery of which teeth 28a are provided, and is wound between the drive pulley 26 and the driven pulley 27. Therefore, rotation of the second motor 18 is transmitted to the second ball nut 16 via the drive pulley 26, the belt 28, and the driven pulley 27.

The first belt transmission mechanism 21 and the first ball screw $BS_1$ make up a first transmission mechanism that transmits the driving force of the first motor 17 to the wheel turning shaft 12. The second belt transmission mechanism 22 and the second ball screw $BS_2$ make up a second transmission mechanism that transmits the driving force of the second motor 18 to the wheel turning shaft 12. A speed reducing ratio from the first motor 17 to the wheel turning shaft 12 (the speed reducing ratio of the first transmission mechanism) and a speed reducing ratio from the second motor 18 to the wheel turning shaft 12 (the speed reducing ratio of the second transmission mechanism) are the same values. The lead of the first ball screw groove portion 12a and the lead of the second ball screw groove portion 12b in the wheel turning shaft 12 are the same values. Therefore, the amount of movement of the wheel turning shaft 12 when the first motor 17 makes one revolution and the amount of movement of the wheel turning shaft 12 when the second motor 18 makes one revolution are the same values.

The turning apparatus 10 includes a first rotation angle sensor 31 and a second rotation angle sensor 32. For example, a resolver is employed as each of the first rotation angle sensor 31 and the second rotation angle sensor 32. A detection range of the first rotation angle sensor 31 is 360° corresponding to one cycle of an electrical angle of the first motor 17. A detection range of the second rotation angle sensor 32 is 360° corresponding to one cycle of an electrical angle of the second motor 18.

The first rotation angle sensor 31 is attached to the first motor 17. The first rotation angle sensor 31 detects a rotation angle (electrical angle) α of the first motor 17. The first rotation angle sensor 31 generates a first sine signal (sin signal) that varies sinusoidally as an electrical signal with rotation of the first motor 17 and a first cosine signal (cos signal) that varies cosinusoidally with rotation of the first motor 17. The first rotation angle sensor 31 computes the arc tangent based on the first sine signal and the first cosine signal as the rotation angle α of the first motor 17. The rotation angle α varies in a sawtooth wave shape at a cycle according to the multiplication factor of angle of the first rotation angle sensor 31. In other words, the rotation angle α varies in such a manner as to repeat rising and steep falling with rotation of the first motor 17.

The second rotation angle sensor 32 is attached to the second motor 18. The second rotation angle sensor 32 detects a rotation angle (electrical angle) β of the second motor 18. The second rotation angle sensor 32 generates a second sine signal that varies sinusoidally as an electrical signal with rotation of the second motor 18 and a second cosine signal that varies cosinusoidally with rotation of the second motor 18. The second rotation angle sensor 32 computes the arc tangent based on the second sine signal and the second cosine signal as the rotation angle β of the second motor 18. The rotation angle β varies in a sawtooth wave shape at a cycle according to the multiplication factor of angle of the second rotation angle sensor 32.

The first rotation angle sensor 31 and the second rotation angle sensor 32 have mutually different multiplication factors of angle. A multiplication factor of angle means the ratio of an electrical angle of an electrical signal to a rotation angle (mechanical angle) of the first motor 17 or the second motor 18. When, for example, the first rotation angle sensor 31 generates an electrical signal for one cycle while the first motor 17 makes one revolution, the multiplication factor of angle of the first rotation angle sensor 31 is one (1×). When, for example, the first rotation angle sensor 31 generates an electrical signal for four cycles while the first motor 17 makes one revolution, the multiplication factor of angle of the first rotation angle sensor 31 is four (4×).

Since the first rotation angle sensor 31 and the second rotation angle sensor 32 have mutually different multiplication factors of angle, the number of cycles of the rotation angle α per one revolution of the first motor 17 and the number of cycles of the rotation angle β per one revolution of the second motor 18 are different from each other. In other words, the value of rotation angle (mechanical angle) of the first motor 17 per one cycle of an electrical signal generated by the first rotation angle sensor 31 and the value of rotation angle (mechanical angle) of the second motor 18 per one cycle of an electrical signal generated by the second rotation angle sensor 32 are different from each other.

The first motor 17 is coupled to the wheel turning shaft 12 and, by extension, the first steered wheel 15a and the second steered wheel 15b via the first belt transmission mechanism 21 and the first ball screw $BS_1$. The second motor 18 is coupled to the wheel turning shaft 12 and, by extension, the first steered wheel 15a and the second steered wheel 15b via the second belt transmission mechanism 22 and the second ball screw $BS_2$. For this reason, the rotation angle α of the first motor 17 and the rotation angle β of the second motor 18 each are a value that reflects an absolute position of the wheel turning shaft 12 in the axial direction and, by extension, the wheel steering angle θwa of the first steered wheel 15a and the wheel steering angle θwb of the second steered wheel 15b.

The turning apparatus 10 includes a first controller 41 and a second controller 42. The first controller 41 controls the first motor 17. The first controller 41 acquires a target wheel steering angle θ* computed by, for example, an in-vehicle host controller according to a steering status of the vehicle or a travel status of the vehicle. The first controller 41 acquires the rotation angle α of the first motor 17, detected through the first rotation angle sensor 31, and the rotation angle β of the second motor 18, detected through the second rotation angle sensor 32.

The first controller 41 executes wheel steering control to turn the first steered wheel 15a and the second steered wheel 15b through drive control over the first motor 17 in accordance with a steering status. The first controller 41 computes an actual absolute position of the wheel turning shaft 12 by using the rotation angle α of the first motor 17, detected through the first rotation angle sensor 31, and the rotation angle β of the second motor 18, detected through the second rotation angle sensor 32. The first controller 41 computes a target absolute position of the wheel turning shaft 12 based on the target wheel steering angle θ*. The first controller 41 finds a difference between the target absolute position and actual absolute position of the wheel turning shaft 12 and executes position feedback control for controlling an electric power supplied to the first motor 17 such that the difference is minimized. The first controller 41 computes a current command value for the first motor 17 and a current command value for the second motor 18 in accordance with a difference between the target absolute position and actual absolute position of the wheel turning shaft 12 and supplies a current according to the computed current command value to the first motor 17.

The second controller 42 controls the second motor 18. The second controller 42 executes wheel steering control for turning the first steered wheel 15a and the second steered wheel 15b through drive control over the second motor 18 in accordance with a steering status. The second controller 42 acquires a current command value computed by the first controller 41 and controls an electric power supplied to the second motor 18 based on the acquired current command value.

The second controller 42 acquires the target wheel steering angle θ* computed by the host controller as described above, the rotation angle α of the first motor 17, detected through the first rotation angle sensor 31, and the rotation angle β of the second motor 18, detected through the second rotation angle sensor 32. The second controller 42 has a first function of computing an actual absolute position of the wheel turning shaft 12 by using the rotation angle α of the first motor 17, detected through the first rotation angle sensor 31, and the rotation angle β of the second motor 18, detected through the second rotation angle sensor 32. The second controller 42 has a second function of computing a target absolute position of the wheel turning shaft 12 based on the target wheel steering angle θ*. The second controller 42 has a third function of finding a difference between the target absolute position and actual absolute position of the wheel turning shaft 12 and executing position feedback control for controlling an electric power supplied to the second motor 18 such that the difference is minimized. When the first controller 41 is operating normally, the second controller 42 maintains the first to third functions in a stopped state. In this case, the target wheel steering angle θ*, the rotation angle α of the first motor 17, and the rotation angle β of the second motor 18 are not used.

With rotation of the first ball nut 15 and the second ball nut 16 relative to the wheel turning shaft 12, a torque about the axis is applied to the wheel turning shaft 12. When the wheel turning shaft 12 is intended to be moved in a specific direction, the operations of the first motor 17 and the second motor 18 are controlled such that the first ball nut 15 and the second ball nut 16 rotate in opposite directions from each other and the magnitude of torque applied to the wheel turning shaft 12 with rotation of one of the ball nuts is basically the same value as the magnitude of torque applied to the wheel turning shaft 12 with rotation of the other one of the ball nuts. For this reason, a torque applied to the wheel turning shaft 12 with rotation of the first ball nut 15 and a torque applied to the wheel turning shaft 12 with rotation of the second ball nut 16, which are torques in opposite directions from each other, are cancelled out. Therefore, application of a torque about the axis to the wheel turning shaft 12 is suppressed.

Figure 2:
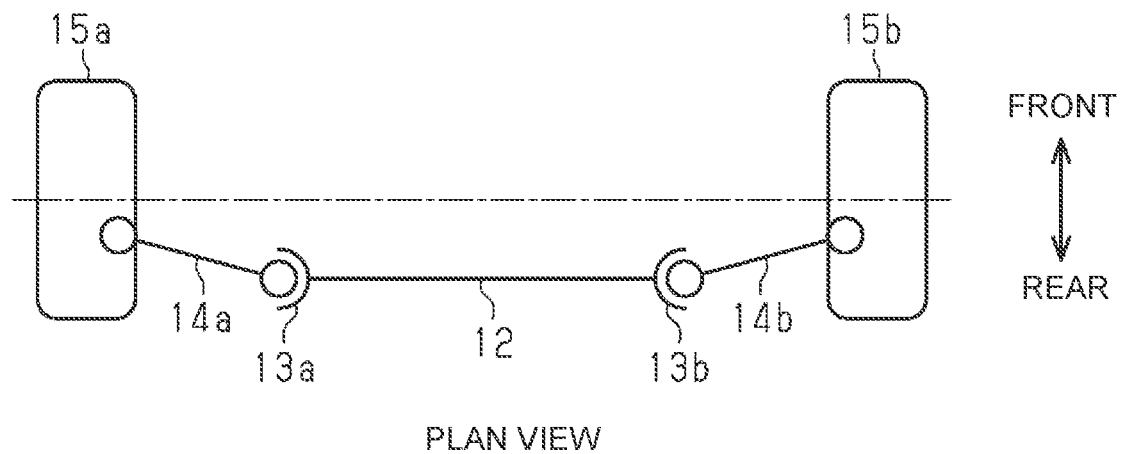
FIG. 2 is a plan view of the turning apparatus the first embodiment when viewed in a direction perpendicular to the vehicle travel direction.

As shown in FIG. 2, when viewed in a direction from above in the case where the turning apparatus 10 is installed in the vehicle, the end of the first tie rod 14a across from the first inner ball joint 13a is coupled at a position adjacent to the rear side of the vehicle with respect to the rotation center of the first steered wheel 15a when the vehicle travels straight ahead. The end of the second tie rod 14b across from the second inner ball joint 13b is coupled at a position adjacent to the rear side of the vehicle with respect to the rotation center of the second steered wheel 15b when the vehicle travels straight ahead. Such a link structure is commonly called rear link.

Figure 3:
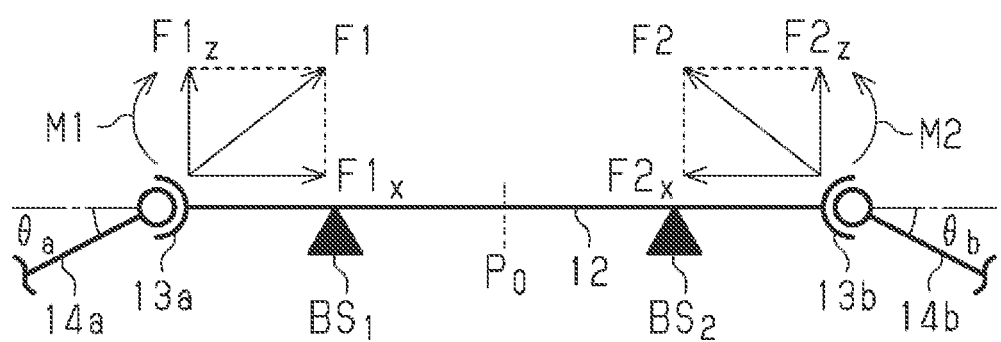
FIG. 3 is a schematic view showing reverse input loads acting on a wheel turning shaft according to the first embodiment.

As shown in FIG. 3, in a state where the wheel turning shaft 12 is located at a neutral position $P_0$ corresponding to a straight-ahead state of the vehicle, the first tie rod 14a makes a first inclination $θ_a$ with the wheel turning shaft 12. Also, in a state where the wheel turning shaft 12 is located at the neutral position $P_0$, the second tie rod 14b makes a second inclination $θ_b$ with the wheel turning shaft 12. For this reason, a reverse input load F1 from the first steered wheel 15a is decomposed into an axial load F1 acting in a direction along the axial direction of the wheel turning shaft 12 and a radial load $F1_z$ acting in a direction perpendicular to the axial direction of the wheel turning shaft 12. In other words, bending moment M1 is applied to the first ball screw $BS_1$ by the radial load $F1_z$ acting on the first end of the wheel turning shaft 12. In addition, a reverse input load F2 from the second steered wheel 15b is decomposed into an axial load $F2_x$ acting in a direction along the axial direction of the wheel turning shaft 12 and a radial load $F2_z$ acting in a direction perpendicular to the axial direction of the wheel turning shaft 12. In other words, bending moment M2 is applied to the second ball screw $BS_2$ by the radial load $F2_z$ acting on the second end of the wheel turning shaft 12.

The value of the bending moment M1 varies according to the first inclination $θ_a$ that is an angle formed between the first tie rod 14a and the wheel turning shaft 12 and a distance from the first inner ball joint 13a to the first ball screw $BS_1$. The value of the bending moment M2 varies according to the second inclination $\theta_b$ that is an angle formed between the second tie rod 14b and the wheel turning shaft 12 and a distance from the second inner ball joint 13b to the second ball screw $BS_2$. The value of the first inclination $\theta_a$ and the value of the second inclination $\theta_b$ vary with the wheel steering angle θwa of the first steered wheel 15a and the wheel steering angle θwb of the second steered wheel 15b, that is, the position of the wheel turning shaft 12. As the value of the first inclination $\theta_a$ increases, the value of the radial load $F1_z$ and, by extension, the value of the bending moment M1 increase. As the value of the second inclination $\theta_b$ increases, the value of the radial load $F2_z$ and, by extension, the value of the bending moment M2 increase.

The first inclination $\theta_a$ and the second inclination $\theta_b$ for the absolute position of the wheel turning shaft 12 are different from each other. For this reason, a reverse input load F1 from the first steered wheel 15a and a reverse input load F2 from the second steered wheel 15b are different from each other. The direction of the reverse input load F1 from the first steered wheel 15a and the direction of the reverse input load F2 from the second steered wheel 15b are also different from each other.

Figure 4:
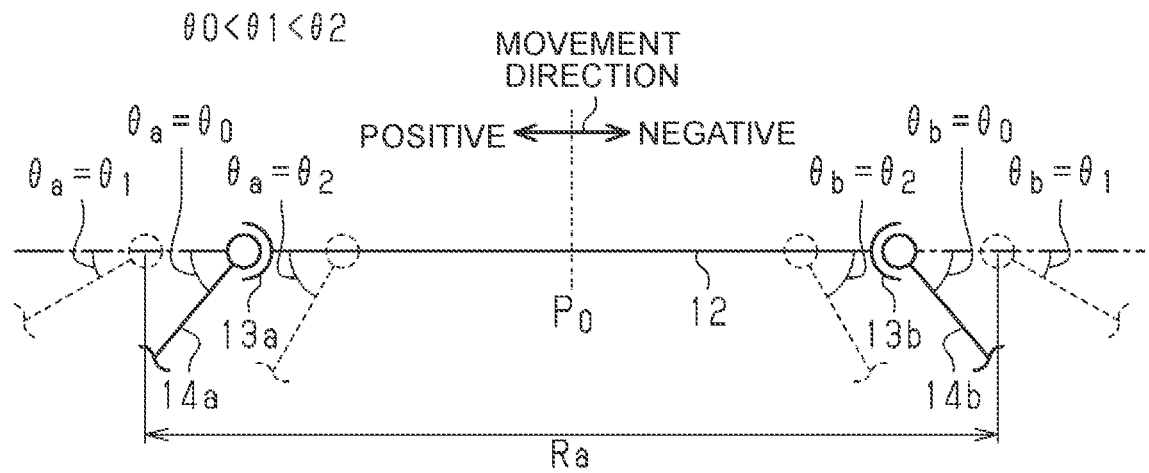
FIG. 4 is a relevant front view of the turning apparatus for illustrating the relationship between a position of the wheel turning shaft and an inclination according to the first embodiment.

Next, the relationship between a first inclination $\theta_a$ and a position of the wheel turning shaft 12 and the relationship between a second inclination $\theta_b$ and a position of the wheel turning shaft 12 will be described. As shown in FIG. 4, the wheel turning shaft 12 moves in the axial direction within a maximum movement range Ra determined with respect to the neutral position $P_0$ corresponding to the straight-ahead direction of the vehicle. A first direction (left direction in FIG. 4) with respect to the neutral position $P_0$ of the wheel turning shaft 12 is defined as positive direction. A second direction (right direction in FIG. 4) with respect to the neutral position $P_0$ of the wheel turning shaft 12 is defined as negative direction.

Figure 5:
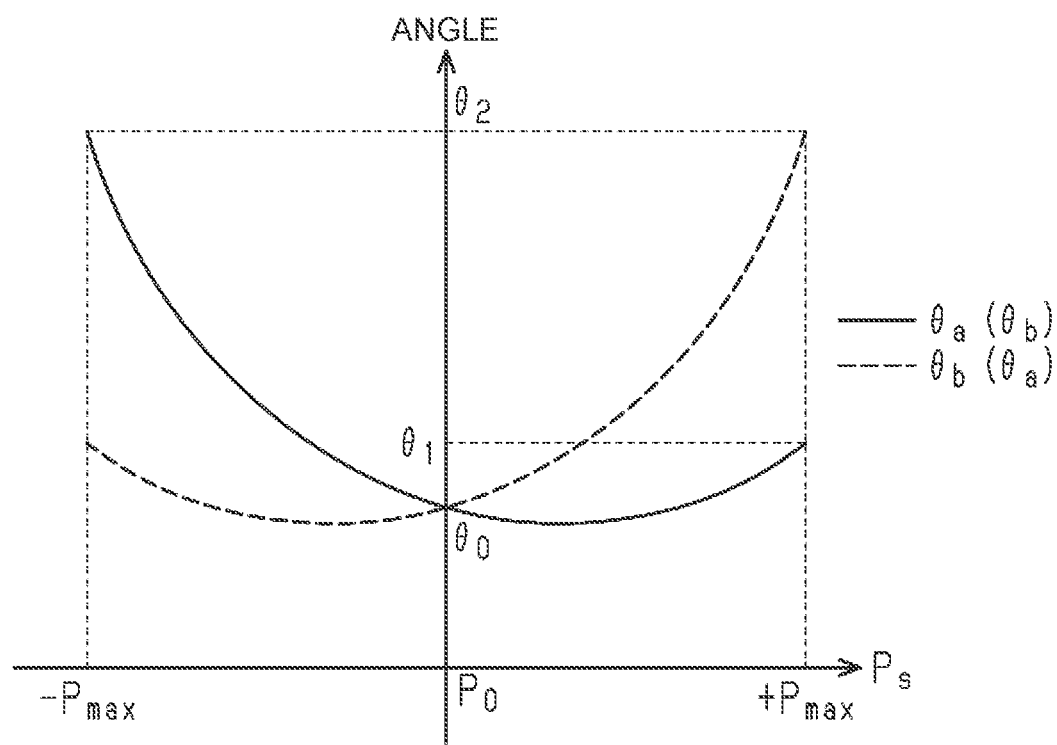
FIG. 5 is a graph showing the relationship between a position of the wheel turning shaft and an inclination according to the first embodiment.

As shown in the graph of FIG. 5, the change characteristics of the first inclination $\theta_a$ against a position change of the wheel turning shaft 12 with respect to the neutral position $P_0$ of the wheel turning shaft 12 and the change characteristics of the second inclination $\theta_b$ against a position change of the wheel turning shaft 12 with respect to the neutral position $P_0$ of the wheel turning shaft 12 are inverse from each other.

As represented by the continuous line in FIG. 5, when the wheel turning shaft 12 is located at the neutral position $P_0$, that is, when the amount of movement with respect to the neutral position $P_0$ of the wheel turning shaft 12 is zero, the first inclination $\theta_a$ is maintained at an angle $\theta_0$. As the wheel turning shaft 12 moves in the positive direction with respect to the neutral position $P_0$, the value of the first inclination $\theta_a$ gradually reduces and then increases. When the wheel turning shaft 12 reaches a positive maximum position $+P_{max}$, the value of the first inclination $\theta_a$ reaches an angle $\theta_1$ ($\theta_0 < \theta_1$). In contrast, as the wheel turning shaft 12 moves in the negative direction with respect to the neutral position $P_0$, the value of the first inclination $\theta_a$ gradually increases. When the wheel turning shaft 12 reaches a negative maximum position $-P_{max}$, the value of the first inclination $\theta_a$ reaches an angle $\theta_2$ ($\theta_0 < \theta_1 < \theta_2$).

As represented by the dashed line in FIG. 5, when the wheel turning shaft 12 is located at the neutral position $P_0$, the second inclination $\theta_b$ is maintained at the angle $\theta_0$. As the wheel turning shaft 12 moves in the positive direction with respect to the neutral position $P_0$, the value of the second inclination $\theta_b$ gradually increases. When the wheel turning shaft 12 reaches a positive maximum position $+P_{max}$, the value of the second inclination $\theta_b$ reaches the angle $\theta_2$ ($\theta_0 < \theta_2$). In contrast, as the wheel turning shaft 12 moves in the negative direction with respect to the neutral position $P_0$, the value of the second inclination $\theta_b$ gradually reduces and then increases. When the wheel turning shaft 12 reaches a negative maximum position $-P_{max}$, the value of the second inclination $\theta_b$ reaches the angle $\theta_1$ ($\theta_0 < \theta_1 < \theta_2$).

When changes in the first inclination $\theta_a$ and the second inclination $\theta_b$ against the position of the wheel turning shaft 12 in FIG. 5 are viewed, the first inclination $\theta_a$ and the second inclination $\theta_b$ are bilaterally symmetric with respect to the neutral position $P_0$. This is because geometrical arrangement of the wheel turning shaft 12, the first tie rod 14a, the second tie rod 14b, the first steered wheel 15a, and the second steered wheel 15b is bilaterally symmetric.

The value of the bending moment M1 is obtained by multiplying the value of the radial load $F1_z$ acting on the wheel turning shaft 12 and a distance from the first inner ball joint 13a to the first ball screw $BS_1$. For this reason, as the value of the first inclination $\theta_a$ increases and the value of the radial load $F1_z$ acting on the wheel turning shaft 12 increases, or as a distance from the first inner ball joint 13a to the first ball screw $BS_1$ extends, the value of the bending moment M1 increases.

The value of the bending moment M2 is obtained by multiplying the value of the radial load $F2_z$ acting on the wheel turning shaft 12 and a distance from the second inner ball joint 13b to the second ball screw $BS_2$. For this reason, as the value of the second inclination $\theta_b$ increases and the value of the radial load $F2_z$ acting on the wheel turning shaft 12 increases, or as a distance from the second inner ball joint 13b to the second ball screw $BS_2$ extends, the value of the bending moment M2 increases. When such radial loads $F1_z$, $F2_z$ and, by extension, the bending moments M1, M2, are applied to the wheel turning shaft 12, there are concerns about the following situations.

Figure 6:
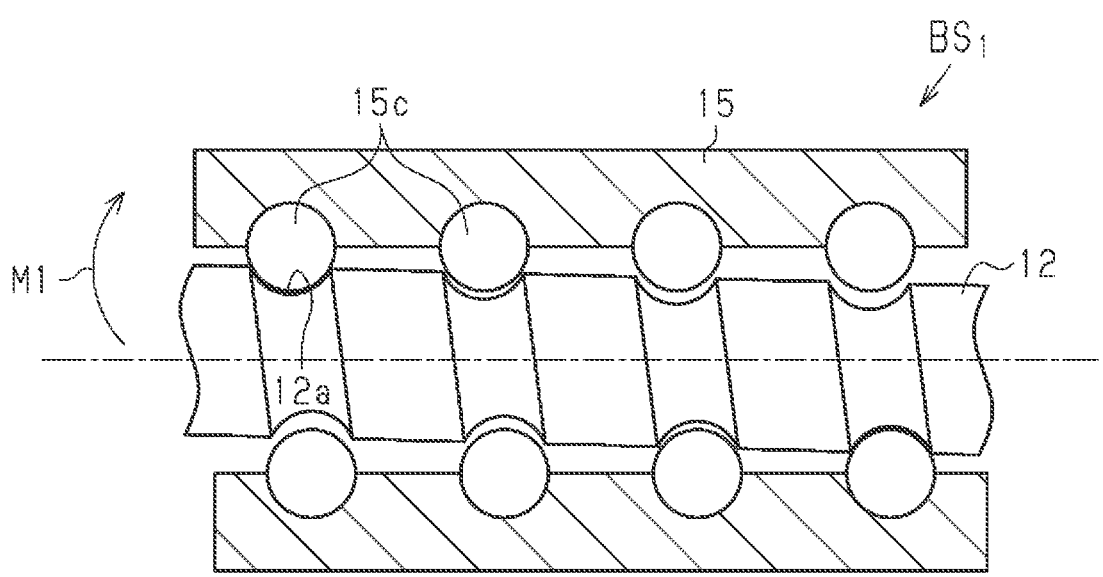
FIG. 6 is a cross-sectional view showing a coupling part between the wheel turning shaft and a ball nut according to the first embodiment.

As shown in FIG. 6, when, for example, the bending moment M1 is applied as a result of application of the radial load $F1_z$ to the wheel turning shaft 12 via the first tie rod 14a, the wheel turning shaft 12 may be slightly bent or inclined about a portion where the first ball screw $BS_1$ is provided depending on the magnitude of the bending moment M1. When such a situation occurs, a load concentrates on balls 15c or part of the first ball screw groove portion 12a (a screw groove portion where the part of the balls 15c contact) in the first ball screw $BS_1$. In other words, there is a nonuniform distribution of a load applied to the balls 15c that roll between the first ball screw groove portion 12a of the wheel turning shaft 12 and the first ball nut 15. For this reason, the product service life of the first ball screw $BS_1$ may decrease. Also, smooth operation of the first ball screw $BS_1$ may be impaired.

When the radial load $F2_z$ or the bending moment M2 is applied to the wheel turning shaft 12 via the second tie rod 14b as well, the product service life of the second ball screw $BS_2$ may decrease as in the case where the radial load $F1_z$ or the bending moment M1 is applied to the wheel turning shaft 12 via the first tie rod 14a. Also, smooth operation of the second ball screw $BS_2$ may be impaired.

In the present embodiment, for the purpose of maintaining and improving the product service life of the first ball screw $BS_1$ and the second ball screw $BS_2$, the following components are employed as the first controller 41 and the second controller 42.

Figure 7:
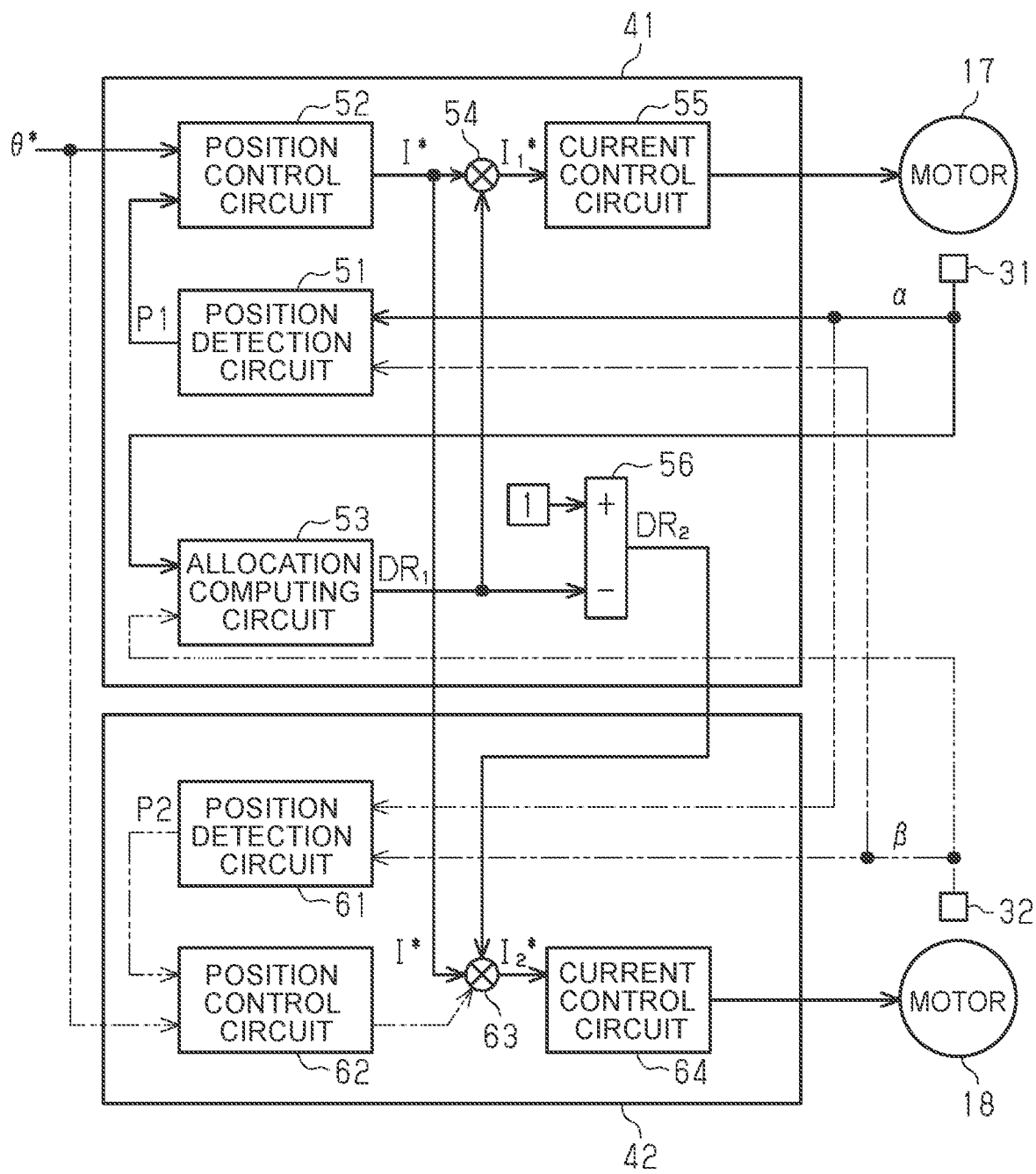
FIG. 7 is a block diagram of a controller according to the first embodiment.

As shown in FIG. 7, the first controller 41 includes a position detection circuit 51, a position control circuit 52, an allocation computing circuit 53, a multiplier 54, a current control circuit 55, and a subtractor 56. The position detection circuit 51 acquires the rotation angle α of the first motor 17, detected through the first rotation angle sensor 31, and the rotation angle β of the second motor 18, detected through the second rotation angle sensor 32, and computes the absolute position P1 of the wheel turning shaft 12 based on the acquired rotation angles α, β. The multiplication factor of angle of the first rotation angle sensor 31 and the multiplication factor of angle of the second rotation angle sensor 32 are set such that the rotation angle α detected by the first rotation angle sensor 31 and the rotation angle β detected by the second rotation angle sensor 32 do not coincide with each other within the maximum movement range of the wheel turning shaft 12. For this reason, a combination of the value of the rotation angle α and the value of the rotation angle β is in a one-to-one correspondence with the absolute position P1 of the wheel turning shaft 12. Therefore, it is possible to immediately detect the absolute position P1 of the wheel turning shaft 12 based on a combination of the two rotation angles α, β. A middle point of a computation range in which the absolute position P1 is computed by the position detection circuit 51 is set as an origin, that is, a turning neutral position (wheel steering angles θwa, θwb=0°) that is the position of the wheel turning shaft 12 when the vehicle is traveling straight ahead.

The position control circuit 52 computes the target absolute position of the wheel turning shaft 12 based on the target wheel steering angle θ* computed by the host controller. Since the wheel turning shaft 12 is interlocked with the steered wheels 15a, 15b, there is a correlation between an absolute position of the wheel turning shaft 12 and each of the wheel steering angles θwa, θwb of the steered wheels 15a, 15b. The target absolute position of the wheel turning shaft 12 is obtained from the target wheel steering angle θ* by using the correlation. The position control circuit 52 finds a difference between the target absolute position of the wheel turning shaft 12 and an actual absolute position P1 of the wheel turning shaft 12, computed by the position detection circuit 51, and computes a current command value I* for the first motor 17 and the second motor 18 such that the difference is minimized. The current command value I* corresponds to a total torque to be generated by the first motor 17 and the second motor 18.

The allocation computing circuit 53, as well as the position control circuit 52, acquires the rotation angle α of the first motor 17, detected through the first rotation angle sensor 31, and the rotation angle β of the second motor 18, detected through the second rotation angle sensor 32, and computes the absolute position Ps of the wheel turning shaft 12 based on the acquired rotation angles α, β.

The allocation computing circuit 53 computes a first allocation rate $DR_1$, for the first motor 17, of the current command value I* computed by the position control circuit 52, based on a current value of the computed absolute position Ps of the wheel turning shaft 12. The first allocation rate $DR_1$ is set to a value that falls within the range greater than or equal to "0" and less than or equal to "1". The allocation computing circuit 53 computes a first allocation rate $DR_1$ by using a map that defines the relationship between an absolute position Ps of the wheel turning shaft 12 and a first allocation rate $DR_1$. The map is stored in a storage device of the first controller 41.

Figure 8:
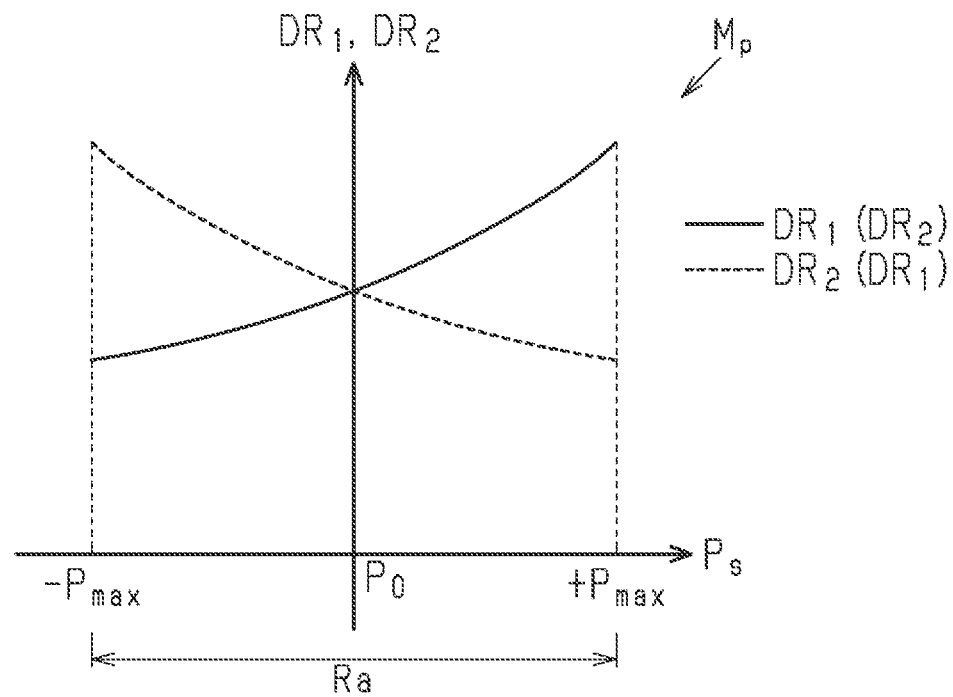
FIG. 8 is a graph showing the relationship between a position of the wheel turning shaft and allocation rates according to the first embodiment.

As shown in FIG. 8, a map $M_p$ is a two-dimensional map of which the abscissa axis represents the absolute position Ps of the wheel turning shaft 12 and the ordinate axis represents the first allocation rate $DR_1$ and has the following characteristics. In other words, as represented by the continuous line in FIG. 8, the first allocation rate $DR_1$ gradually increases within the maximum movement range Ra of the wheel turning shaft 12 as the absolute position Ps of the wheel turning shaft 12 changes from the negative maximum position $-P_{max}$, via the neutral position $P_0$ toward the positive maximum position $+P_{max}$. When the absolute position Ps of the wheel turning shaft 12 is the neutral position $P_0$, the first allocation rate DR1 is "0.5". This is a value corresponding to 50% where the current command value I* computed by the position control circuit 52 is 100%.

The map $M_p$ is set through, for example, simulations. In other words, when the absolute position Ps of the wheel turning shaft 12 is varied, the reverse input load F1 from the first steered wheel 15a and the reverse input load F2 from the second steered wheel 15b at each absolute position Ps of the wheel turning shaft 12 are obtained. In addition, when the absolute position Ps of the wheel turning shaft 12 is varied, the first inclination $θ_a$ of the first tie rod 14a and the second inclination $θ_b$ of the second tie rod 14b at each absolute position Ps of the wheel turning shaft 12 are obtained. Subsequently, a bending moment M1 applied to the first ball screw $BS_1$ and a bending moment M2 applied to the second ball screw $BS_2$ and, by extension, contact pressures applied to the balls of the first ball screw $BS_1$ and the second ball screw $BS_2$ are obtained based on the obtained values of the reverse input loads F1, F2 and the obtained values of the first inclination $θ_a$ and the second inclination $θ_b$ at each absolute position Ps of the wheel turning shaft 12. Based on the viewpoint of minimizing the maximum values of the thus obtained contact pressures, the map $M_p$ is set through adaptation of the value of the first allocation rate $DR_1$ and the value of the second allocation rate $DR_2$ for the absolute position Ps of the wheel turning shaft 12.

As shown in FIG. 7, the multiplier 54 computes a first current command value $I_1$* for the first motor 17 by multiplying the first allocation rate $DR_1$ computed by the allocation computing circuit 53 by the current command value I* computed by the position control circuit 52.

The current control circuit 55 supplies the first motor 17 with an electric power according to the first current command value $I_1$* computed by the multiplier 54. Thus, the first motor 17 generates a torque according to the first current command value $I_1$*.

The subtractor 56 computes a second allocation rate $DR_2$, for the second motor 18, of the current command value I* by subtracting the first allocation rate $DR_1$ computed by the allocation computing circuit 53 from "1" that is a fixed value stored in the storage device of the first controller 41. For example, when the first allocation rate $DR_1$ is set to "0.3", the value of the second allocation rate $DR_2$ is "0.7". When the first allocation rate $DR_1$ is set to "0.5", the value of the second allocation rate $DR_2$ is "0.5". When the first allocation rate $DR_1$ is set to "0.7", the value of the second allocation rate $DR_2$ is "0.3". In other words, a total value of torque generated by the first motor 17 and the second motor 18 is a torque according to the current command value I* computed by the position control circuit 52.

Therefore, the change characteristics of the second allocation rate $DR_2$ against a change in the absolute position Ps of the wheel turning shaft 12 are inverse to the change characteristics of the first allocation rate $DR_1$ against a change in the absolute position Ps of the wheel turning shaft 12. In other words, as represented by the dashed line in FIG. 8, within the maximum movement range Ra of the wheel turning shaft 12, the first allocation rate $DR_1$ gradually reduces and the second allocation rate $DR_2$ gradually increases as the absolute position Ps of the wheel turning shaft 12 moves from the positive maximum position $+P_{max}$, via the neutral position $P_0$ toward the negative maximum position $-P_{max}$. The value of the second allocation rate $DR_2$ when the absolute position Ps of the wheel turning shaft 12 is the positive maximum position $+P_{max}$ and the value of the first allocation rate $DR_1$ when the absolute position Ps of the wheel turning shaft 12 is the negative maximum position $-P_{max}$ are equal to each other. The value of the second allocation rate $DR_2$ when the absolute position Ps of the wheel turning shaft 12 is the negative maximum position $-P_{max}$ and the value of the first allocation rate $DR_1$ when the absolute position Ps of the wheel turning shaft 12 is the positive maximum position $+P_{max}$ are equal to each other. In other words, in FIG. 8, the first allocation rate $DR_1$ and the second allocation rate $DR_2$ are set so as to be symmetric with respect to the neutral position $P_0$ (ordinate axis) of the wheel turning shaft 12 and have mutually inverse characteristics.

As shown in FIG. 7, the second controller 42 includes a position detection circuit 61, a position control circuit 62, a multiplier 63, and a current control circuit 64. The position detection circuit 61 acquires the rotation angle α of the first motor 17, detected through the first rotation angle sensor 31, and the rotation angle β of the second motor 18, detected through the second rotation angle sensor 32, and computes the absolute position P2 of the wheel turning shaft 12 based on the acquired rotation angles α, β. However, the position detection circuit 61 is used as a backup for the first controller 41, and the functions of the position detection circuit 61 are maintained in a stopped state under a normal condition in which the first controller 41 is operating normally.

The position control circuit 62 computes the target absolute position of the wheel turning shaft 12 based on the target wheel steering angle θ* computed by the host controller. The position control circuit 62 finds a difference between the target absolute position of the wheel turning shaft 12 and an actual absolute position P2 of the wheel turning shaft 12, computed by the position detection circuit 61, and computes a current command value I* according to a total torque to be generated by the first motor 17 and the second motor 18 such that the difference is minimized. However, the position control circuit 62 is used as a backup for the first controller 41, and the functions of the position control circuit 62 are maintained in a stopped state under a normal condition in which the first controller 41 is operating normally.

The multiplier 63 computes a second current command value $I_2$* for the second motor 18 by multiplying the second allocation rate $DR_2$ computed by the subtractor 56 of the first controller 41 by the current command value I* computed by the position control circuit 52 of the first controller 41.

The current control circuit 64 supplies the second motor 18 with an electric power according to the second current command value $I_2$* computed by the multiplier 63. Thus, the second motor 18 generates a torque according to the second current command value $I_2$*.

Next, the operation of the present embodiment will be described. The first tie rod 14a is provided at the first inclination $\theta_a$ with respect to the wheel turning shaft 12. The second tie rod 14b is provided at the second inclination $\theta_b$ with respect to the wheel turning shaft 12. For this reason, as the wheel turning shaft 12 approaches the negative maximum position $-P_{max}$, or the positive maximum position $+P_{max}$, with respect to the neutral position $P_0$, the first inclination $\theta_a$ of the first tie rod 14a and the second inclination $\theta_b$ of the second tie rod 14b with respect to the wheel turning shaft 12 increase. As the value of the first inclination $\theta_a$ increases, the value of the radial load $F1_z$ and, by extension, the value of the bending moment M1, applied to the wheel turning shaft 12, increase. As the value of the second inclination $\theta_b$ increases, the value of the radial load $F2_z$ and, by extension, the value of the bending moment M2, applied to the wheel turning shaft 12, increase.

The first inclination $\theta_a$ and the second inclination $\theta_b$ with respect to the absolute position Ps of the wheel turning shaft 12 are mutually different values. For this reason, the values of the radial loads $F1_z$, $F2_z$ and, by extension, the values of bending moments M1, M2, applied to the wheel turning shaft 12, are also mutually different values. Focusing on this fact, in the present embodiment, the torque of the motor 17 associated with the ball screw $BS_1$ or the torque of the motor 18 associated with the ball screw $BS_2$, on a side where a larger one of the radial loads $F1_z$, $F2_z$ is applied is more reduced, while the torque of the motor associated with the ball screw on a side where a smaller one of the radial loads is applied is more increased. In other words, the torque of the motor associated with the ball screw on a side where a larger one of the bending moments M1, M2 is applied is reduced, while the torque of the motor associated with the ball screw on a side where a smaller one of the bending moments is applied is increased.

Thus, by the amount by which the torque of the motor associated with the ball screw on a side where a larger one of the radial loads and, by extension, a larger one of the bending moments, is applied is reduced, concentration of a load on a portion of the balls or part of the ball screw groove in the ball screw on a side where a larger one of the radial loads is applied is suppressed. In other words, by the amount by which the torque of the motor is reduced, ball contact pressures at contact portions between the balls and the ball screw groove, on which a load concentrates, decrease. For this reason, in the ball screw on a side where a larger one of the radial loads is applied, the distribution of a load applied to the balls that roll between the ball screw groove portion of the wheel turning shaft 12 and the ball nut is brought close to a further uniform state. Therefore, the product service life of the ball screw on a side where a larger one of the radial loads is applied is maintained and improved. In addition, smooth operation of the ball screw on a side where a larger one of the radial loads is applied is maintained.

According to the present embodiment, the following advantageous effects are obtained. The value of the first inclination $\theta_a$ that is an angle formed between the first tie rod 14a and the wheel turning shaft 12 and the value of the second inclination $\theta_b$ that is an angle formed between the second tie rod 14b and the wheel turning shaft 12 vary with the position of the wheel turning shaft 12. The first inclination $\theta_a$ and the second inclination $\theta_b$ take different values for the position of the wheel turning shaft 12, and the magnitudes of the radial loads $F1_z$, $F2_z$ that are applied to the wheel turning shaft 12 vary with the first inclination $\theta_a$ and the second inclination $\theta_b$. For this reason, it is possible to suppress concentration of a load on the ball screw on a side where a larger one of the radial loads is applied by allocating a torque generated by the first motor 17 and the second motor 18 in accordance with the position of the wheel turning shaft 12. In other words, it is possible to bring a load on the motion of the first ball screw $BS_1$ and a load on the motion of the second ball screw $BS_2$ to an even state. Therefore, it is possible to maintain and improve the product service life of the first ball screw $BS_1$ and the second ball screw $BS_2$ and, by extension, the product service life of the turning apparatus 10.

The torque of the motor associated with the ball screw on a side where a smaller one of the radial loads is applied is increased by the amount by which the torque of the motor associated with the ball screw on a side where a larger one of the radial loads is applied is reduced. Thus, the first motor 17 and the second motor 18 are capable of generating a torque according to the current command value I* in total. For this reason, while a total torque generated by the first motor 17 and the second motor 18 is ensured, it is possible to protect the first ball screw $BS_1$ and the second ball screw $BS_2$.

The torque of the motor associated with the ball screw to which a larger one of the radial loads is applied is reduced, while the torque of the motor associated with the ball screw to which a smaller one of the radial loads is applied is increased. Thus, it is possible to bring a load on the motion of the first ball screw $BS_1$ and a load on the motion of the second ball screw $BS_2$ to an even state.

The change characteristics of the first inclination $\theta_a$ against a position change of the wheel turning shaft 12 with respect to the neutral position $P_0$ of the wheel turning shaft 12 and the change characteristics of the second inclination $\theta_b$ against a position change of the wheel turning shaft 12 with respect to the neutral position $P_0$ of the wheel turning shaft 12 are inverse from each other. In other words, the change characteristics of the bending moment M1 about the first ball screw $BS_1$ against a position change of the wheel turning shaft 12 with respect to the neutral position $P_0$ of the wheel turning shaft 12 and the change characteristics of the bending moment M2 about the second ball screw $BS_2$ against a position change of the wheel turning shaft 12 with respect to the neutral position $P_0$ of the wheel turning shaft 12 are also inverse from each other. For this reason, it is easy to adjust the first allocation rate $DR_1$ for the first motor 17 associated with the first ball screw $BS_1$ and the second allocation rate $DR_2$ for the second motor 18 associated with the second ball screw $BS_2$.

From the relationship between an absolute position of the wheel turning shaft 12 and a first inclination $\theta_a$ and the relationship between an absolute position of the wheel turning shaft 12 and a second inclination $\theta_b$, shown in the graph of FIG. 5, it is clear that the turning apparatus 10 has such characteristics that, as the wheel turning shaft 12 moves with respect to the neutral position $P_0$, the value of moment about the ball screw located on a side across from a side to which the wheel turning shaft 12 moves increases. For example, as the wheel turning shaft 12 moves in the negative direction (right direction in FIG. 4) with respect to the neutral position $P_0$, the value of the bending moment M1 about the first ball screw $BS_1$ located on a side (left side in FIG. 4) across from a side to which the wheel turning shaft 12 moves increases. Conversely, as the wheel turning shaft 12 moves in the positive direction (left direction in FIG. 4) with respect to the neutral position $P_0$, the value of the bending moment M2 about the second ball screw $BS_2$ located on a side (right side in FIG. 4) across from a side to which the wheel turning shaft 12 moves increases. On an assumption of this fact, as the wheel turning shaft 12 moves with respect to the neutral position $P_0$, the first controller 41 more reduces the allocation rate of the current command value I* for the motor associated with the ball screw on a side across from the side to which the wheel turning shaft 12 moves and more increases the allocation rate of the current command value I* for the motor associated with the ball screw on the side to which the wheel turning shaft 12 moves. For this reason, the first allocation rate $DR_1$ for the first motor 17 and the second allocation rate $DR_2$ for the second motor 18 are further appropriately set according to the position of the wheel turning shaft 12. Therefore, it is possible to further minutely adjust a load on the motion of the first ball screw $BS_1$ and a load on the motion of the second ball screw $BS_2$ according to the position of the wheel turning shaft 12.

When the first motor 17 and the second motor 18 operate in cooperation with each other, a current supplied to the first motor 17 and a current supplied to the second motor 18 are determined by the first controller 41. The second controller 42 just operates to supply the second motor 18, which is an object to be controlled by the second controller 42, with a current according to an individual current command value $(I_2^*)$ based on the second allocation rate $DR_2$ unilaterally determined by the first controller 41. In other words, the first controller 41 and the second controller 42 are in a relation of master machine and slave machine. For this reason, different from, for example, the case where the first controller 41 and the second controller 42 each individually compute a current command value for the motor, which is an object to be controlled by a corresponding one of the controllers 41, 42, by executing position control and control an electric power supplied to the motor, which is the object to be controlled, based on the individually computed current command value, interference between control of the first controller 41 and control of the second controller 42 is suppressed.

Such interference between position feedback control over the wheel turning shaft 12 by the first controller 41 and position feedback control over the wheel turning shaft 12 by the second controller 42 does not occur due to, for example, a lead error between the first ball screw groove portion 12a and second ball screw groove portion 12b of the wheel turning shaft 12, or the like. Therefore, the first motor 17 and the second motor 18 appropriately operate in cooperation with each other, so it is possible to further appropriately turn the first steered wheel 15a and the second steered wheel 15b.

Second Embodiment

Next, a second embodiment of a turning apparatus will be described. The present embodiment basically has similar components to those of the first embodiment. The present embodiment differs from the first embodiment in a coupling position of each tie rod to the associated steered wheel.

Figure 9:
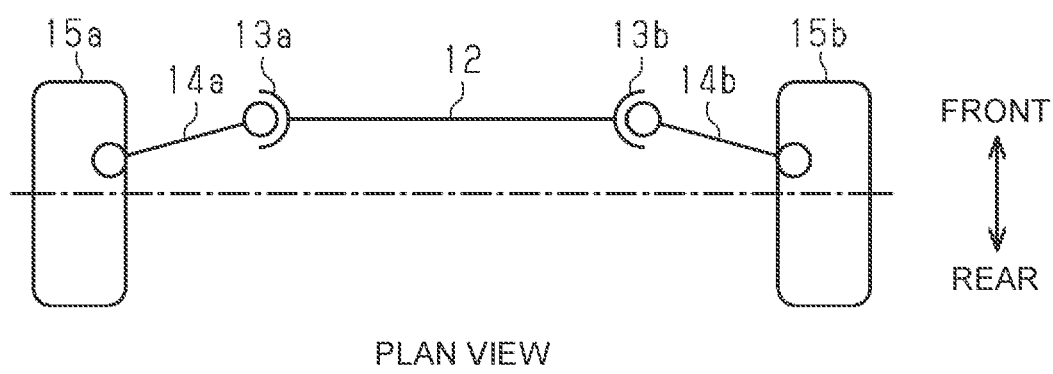
FIG. 9 is a plan view of a turning apparatus according to a second embodiment when viewed in a direction perpendicular to a vehicle travel direction.

As shown in FIG. 9, when viewed in a direction from above in the case where the turning apparatus 10 is installed in the vehicle, the end of the first tie rod 14a across from the first inner ball joint 13a is coupled at a position adjacent to the front side of the vehicle with respect to the rotation center of the first steered wheel 15a when the vehicle travels straight ahead. When viewed in a direction from above in the case where the turning apparatus 10 is installed in the vehicle, the end of the second tie rod 14b across from the second inner ball joint 13b is coupled at a position adjacent to the front side of the vehicle with respect to the rotation center of the second steered wheel 15b when the vehicle travels straight ahead. In this case, the change characteristics of each of the first inclination $\theta_a$ and the second inclination $\theta_b$ against a change in the absolute position Ps of the wheel turning shaft 12 are inverse to the change characteristics shown in FIG. 5. Such a link structure is commonly called front link.

In the front link, the change characteristics of each of the first inclination $\theta_a$ and the second inclination $\theta_b$ against the absolute position Ps of the wheel turning shaft 12 are inverse to those of the rear link. In other words, as represented by the dashed line in FIG. 5, when the wheel turning shaft 12 is located at the neutral position $P_0$, the first inclination $\theta_a$ is maintained at the angle $\theta_0$. As the wheel turning shaft 12 moves in the positive direction with respect to the neutral position $P_0$, the value of the first inclination $\theta_a$ gradually increases. When the wheel turning shaft 12 reaches the positive maximum position $+P_{max}$, the value of the first inclination $\theta_a$ reaches the angle $\theta_2$ ($\theta_0 < \theta_2$). In contrast, as the wheel turning shaft 12 moves in the negative direction with respect to the neutral position $P_0$, the value of the first inclination $\theta_a$ gradually reduces and then increases. When the wheel turning shaft 12 reaches the negative maximum position $-P_{max}$, the value of the first inclination $\theta_a$ reaches the angle $\theta_1$ ($\theta_0 < \theta_1 < \theta_2$).

As represented by the continuous line in FIG. 5, when the wheel turning shaft 12 is located at the neutral position $P_0$, the second inclination $\theta_b$ is maintained at the angle $\theta_0$. As the wheel turning shaft 12 moves in the positive direction with respect to the neutral position $P_0$, the value of the second inclination $\theta_b$ gradually reduces and then increases. When the wheel turning shaft 12 reaches a positive maximum position $+P_{max}$, the value of the second inclination $\theta_b$ reaches the angle $\theta_1$ ($\theta_0 < \theta_1$). In contrast, as the wheel turning shaft 12 moves in the negative direction with respect to the neutral position $P_0$, the value of the second inclination $\theta_b$ gradually increases. When the wheel turning shaft 12 reaches the negative maximum position $-P_{max}$, the value of the second inclination $\theta_b$ reaches the angle $\theta_2$ ($\theta_0 < \theta_1 < \theta_2$).

Therefore, the change characteristics of each of the first allocation rate $DR_1$ and the second allocation rate $DR_2$ against a change in the absolute position Ps of the wheel turning shaft 12 are also inverse to the map $M_p$ shown in FIG. 8.

As represented by the dashed line in FIG. 8, the first allocation rate $DR_1$ gradually increases within the maximum movement range Ra of the wheel turning shaft 12 as the absolute position Ps of the wheel turning shaft 12 changes from the positive maximum position $+P_{max}$ via the neutral position $P_0$ toward the negative maximum position $-P_{max}$. For this reason, as represented by the continuous line in FIG. 8, the second allocation rate $DR_2$ gradually increases within the maximum movement range Ra of the wheel turning shaft 12 as the absolute position Ps of the wheel turning shaft 12 changes from the negative maximum position $-P_{max}$ via the neutral position $P_0$ toward the positive maximum position $+P_{max}$.

The value of the first allocation rate $DR_1$ when the absolute position Ps of the wheel turning shaft 12 is the positive maximum position $+P_{max}$ and the value of the second allocation rate $DR_2$ when the absolute position Ps of the wheel turning shaft 12 is the negative maximum position $-P_{max}$ are equal to each other. The value of the first allocation rate $DR_1$ when the absolute position Ps of the wheel turning shaft 12 is the negative maximum position $-P_{max}$ and the value of the second allocation rate $DR_2$ when the absolute position Ps of the wheel turning shaft 12 is the positive maximum position $+P_{max}$ are equal to each other. In other words, in FIG. 8, the first allocation rate $DR_1$ and the second allocation rate $DR_2$ are set so as to be symmetric with respect to the neutral position $P_0$ (ordinate axis) of the wheel turning shaft 12 and have mutually inverse characteristics.

As described above, the change characteristics of each of the first inclination $\theta_a$ and the second inclination $\theta_b$ against a change in the absolute position Ps of the wheel turning shaft 12 are inverse to the change characteristics shown in FIG. 5. For this reason, the turning apparatus 10 has such characteristics that, as the wheel turning shaft 12 moves with respect to the neutral position $P_0$, the value of moment about the ball screw located on a side to which the wheel turning shaft 12 moves increases.

For example, as the wheel turning shaft 12 moves in the negative direction (right direction in FIG. 4) with respect to the neutral position $P_0$, the value of the bending moment M2 about the second ball screw $BS_2$ located on a side (right side in FIG. 4) to which the wheel turning shaft 12 moves increases. Conversely, as the wheel turning shaft 12 moves in the positive direction (left direction in FIG. 4) with respect to the neutral position $P_0$, the value of the bending moment M1 about the first ball screw $BS_1$ located on a side (left side in FIG. 4) to which the wheel turning shaft 12 moves increases.

On an assumption of this fact, as the wheel turning shaft 12 moves with respect to the neutral position $P_0$, the first controller 41 more reduces the allocation rate of the current command value I* for the motor associated with the ball screw on a side to which the wheel turning shaft 12 moves and more increases the allocation rate of the current command value I* for the motor associated with the ball screw on a side across from the side to which the wheel turning shaft 12 moves.

Hence, according to the second embodiment, similar advantageous effects to those of the first embodiment are obtained. The first and second embodiments may be modified as follows.

OTHER EMBODIMENTS

In the first and second embodiments, when the wheel turning shaft 12 is located at the neutral position $P_0$, the first allocation rate $DR_1$, for the first motor 17, of the current command value I* is set to "0.5"; however, the configuration is not limited thereto. The first allocation rate $DR_1$ when the wheel turning shaft 12 is located at the neutral position $P_0$ may be set to an appropriate value such as "0.6" or "0.4" according to product specifications. When the first allocation rate $DR_1$ can be set to "0.6", the second allocation rate $DR_2$ is "0.4". When the first allocation rate $DR_1$ can be set to "0.4", the second allocation rate $DR_2$ is "0.6".

In the first and second embodiments, the first ball screw groove portion 12a may be formed as left-hand thread, and the second ball screw groove portion 12b may be formed as right-hand thread. In other words, the first ball screw groove portion 12a and the second ball screw groove portion 12b just need to have an opposite thread relation. Alternatively, both the first ball screw groove portion 12a and the second ball screw groove portion 12b may be formed as right-hand thread or left-hand thread. When this configuration is employed, the wheel turning shaft 12 includes a rotation restriction portion for suppressing rotation of the wheel turning shaft 12 relative to the housing 11.

In the first and second embodiments, the allocation computing circuit 53 may compute a first allocation rate $DR_1$ by using the absolute position P1 of the wheel turning shaft 12, computed by the first controller 41, or the absolute position P2 of the wheel turning shaft 12, computed by the second controller 42. With this configuration, it is possible to reduce the computation load of the allocation computing circuit 53 by the amount by which the allocation computing circuit 53 does not need to compute the absolute position Ps of the wheel turning shaft 12.

In the first and second embodiments, the in-vehicle host controller may be configured not to compute the target wheel steering angle $\theta^*$, and may be configured to compute a target absolute position of the wheel turning shaft 12 according to a steering status of the vehicle or a travel status of the vehicle. In this case, the first controller 41 and the second controller 42 acquire the target absolute position of the wheel turning shaft 12, computed by the host controller, and control an electric power supplied to the first motor 17 and an electric power supplied to the second motor 18 by using the acquired target absolute position.

In the first and second embodiments, the first controller 41 may compute a target rotation angle of the first motor 17 based on the target wheel steering angle $\theta^*$, find a difference between the computed target rotation angle of the first motor 17 and the rotation angle $\alpha$ of the first motor 17, detected through the first rotation angle sensor 31, and control an electric power supplied to the first motor 17 such that the difference is minimized. The second controller 42, as well as the first controller 41, may compute a target rotation angle of the second motor 18 based on the target wheel steering angle $\theta^*$, find a difference between the computed target rotation angle of the second motor 18 and the rotation angle $\beta$ of the second motor 18, detected through the second rotation angle sensor 32, and control an electric power supplied to the second motor 18 such that the difference is minimized.

In the first and second embodiments, a configuration in which the first belt transmission mechanism 21 serving as a first transmission mechanism that transmits the driving force of the first motor 17 to the wheel turning shaft 12 is omitted may be employed, and a configuration in which the second belt transmission mechanism 22 serving as a second transmission mechanism that transmits the driving force of the second motor 18 to the wheel turning shaft 12 is omitted may be employed. In this case, for example, the first motor 17 and the second motor 18 are provided coaxially with the wheel turning shaft 12. The output shaft 17a of the first motor 17 is coupled to the first ball nut 15 so as to be integrally rotatable, and the output shaft 18a of the second motor 18 is coupled to the second ball nut 16 so as to be integrally rotatable. Even in the case where this configuration is employed, similar advantageous effects to those of the first and second embodiments are obtained.

In the first and second embodiments, components corresponding to the allocation computing circuit 53 and the subtractor 56 may be provided not only in the first controller 41 but also in the second controller 42. With this configuration, the second controller 42 has the same configuration as the configuration of the first controller 41 and is able to be used as a backup device for the first controller 41. The allocation computing circuit of the second controller 42 computes a second allocation rate $DR_2$, for the second motor 18, of the current command value $I^*$ computed by the position control circuit 62. The subtractor of the second controller 42 computes a first allocation rate $DR_1$, for the first motor 17, of the current command value $I^*$ by subtracting the second allocation rate $DR_2$ computed by the allocation computing circuit of the second controller 42 from "1" that is a fixed value stored in the storage device of the second controller 42. However, the allocation computing circuit and subtractor of the second controller 42 are used as a backup for the first controller 41, and the functions of the allocation computing circuit and subtractor are maintained in a stopped state when the first controller 41 is operating normally.

In the first and second embodiments, a configuration in which the position detection circuit 61 and the position control circuit 62 are omitted may be employed as the second controller 42. With this configuration, the configuration of the second controller 42 is simplified.

In the first and second embodiments, the first controller 41 and the first motor 17 may be provided integrally. The second controller 42 and the second motor 18 may be provided integrally.

The turning apparatus 10 in each of the first and second embodiments may be applied to a steer-by-wire steering system in which power transmission between a steering wheel and a wheel turning shaft are separated. The steer-by-wire steering system includes a reaction motor that is a source for generating a steering reaction applied to a steering shaft and a reaction controller that controls the drive of the reaction motor, and may include a reaction controller that computes a target steering angle of the steering wheel based on a steering status of the vehicle or a travel status of the vehicle. In this case, the first controller 41 and the second controller 42 may be configured to acquire a target steering angle computed by, for example, the reaction controller serving as a host controller, as a target wheel steering angle $\theta^*$. Alternatively, the turning apparatus 10 may be applied to an electric power steering system in which a steering wheel and a wheel turning shaft are connected by a steering shaft and a rack and pinion mechanism.

In the first and second embodiments, the turning apparatus 10 may be configured as a right and left independent turning apparatus that turns the first steered wheel 15a and the second steered wheel 15b independently of each other. In this case, a configuration including a first wheel turning shaft in which the first ball screw $BS_1$ is provided and a second wheel turning shaft in which the second ball screw $BS_2$ is provided is employed as a turning apparatus.

What is claimed is:

1. A turning apparatus comprising:
   tie rods respectively coupled to steered wheels of a vehicle;
   a wheel turning shaft at both ends of which the tie rods are respectively swingably coupled at angles, the wheel turning shaft being configured to linearly move in an axial direction to turn the steered wheels of the vehicle via the tie rods;
   two motors configured to generate a torque that is a source of a driving force to be applied to the wheel turning shaft;
   two ball screws each configured to individually convert rotating motion of a corresponding one of the two motors to linear motion of the wheel turning shaft, the two ball screws respectively having external thread grooves disposed at different positions in the axial direction on an outer periphery of the wheel turning shaft;
   a transmission mechanism configured to transmit a torque of each of the motors to a corresponding one of the ball screws; and
   two controllers each configured to individually control a corresponding one of the two motors, wherein:
      a first controller that is any one of the two controllers is configured to compute a current command value according to a total value of torque to be generated by the two motors and configured to allocate the computed current command value to the motors at a ratio that varies with a position of the wheel turning shaft in the axial direction;
      the two controllers each are configured to supply any one of the motors, which is an object to be controlled by a corresponding one of the controllers, with a current according to an individual current command value allocated to the any one of the motors, which is the object to be controlled;

the first controller is configured to reduce an allocation rate of the current command value to the motor associated with the ball screw on a side where a value of moment is larger and is configured to increase an allocation rate of the current command value to the motor associated with the ball screw on a side where a value of moment is smaller; and the turning apparatus is configured to meet the following conditions:
  i) the moment is applied to each of the ends of the wheel turning shaft about a corresponding one of the two ball screws according to a reverse input load from a corresponding one of the steered wheels; and
  ii) the moment varies with the position of the wheel turning shaft in the axial direction due to swingable coupling of each of the tie rods to a corresponding one of the ends of the wheel turning shaft at an angle.

2. A turning apparatus comprising:

tie rods respectively coupled to steered wheels of a vehicle;

a wheel turning shaft at both ends of which the tie rods are respectively swingably coupled at angles, the wheel turning shaft being configured to linearly move in an axial direction to turn the steered wheels of the vehicle via the tie rods;

two motors configured to generate a torque that is a source of a driving force to be applied to the wheel turning shaft;

two ball screws each configured to individually convert rotating motion of a corresponding one of the two motors to linear motion of the wheel turning shaft, the two ball screws respectively having external thread grooves disposed at different positions in the axial direction on an outer periphery of the wheel turning shaft;

a transmission mechanism configured to transmit a torque of each of the motors to a corresponding one of the ball screws; and two controllers each configured to individually control a corresponding one of the two motors, wherein:
  a first controller that is any one of the two controllers is configured to compute a current command value according to a total value of torque to be generated by the two motors and configured to allocate the computed current command value to the motors at a ratio that varies with a position of the wheel turning shaft in the axial direction;
  the two controllers each are configured to supply any one of the motors, which is an object to be controlled by a corresponding one of the controllers, with a current according to an individual current command value allocated to the any one of the motors, which is the object to be controlled;
  first change characteristics and second change characteristics have mutually inverse characteristics;
  the first change characteristics are change characteristics of an allocation rate of the current command value to the motor associated with a first ball screw of the two ball screws against a position change of the wheel turning shaft in the axial direction with respect to a neutral position of the wheel turning shaft; and
  the second change characteristics are change characteristics of an allocation rate of the current command value to the motor associated with a second ball screw of the two ball screws against the position change of the wheel turning shaft in the axial direction with respect to the neutral position of the wheel turning shaft.

3. The turning apparatus according to claim 2, wherein:
the first controller is configured to, as the wheel turning shaft moves with respect to the neutral position, reduce more the allocation rate of the current command value to the motor associated with the ball screw disposed on a side across from a side to which the wheel turning shaft moves and increase more the allocation rate of the current command value to the motor associated with the ball screw on the side to which the wheel turning shaft moves; and the turning apparatus is configured to meet such a condition that, as the wheel turning shaft moves with respect to the neutral position, a value of moment that is applied to the ball screw disposed on the side across from the side to which the wheel turning shaft moves increases.

4. The turning apparatus according to claim 2, wherein:
the first controller is configured to, as the wheel turning shaft moves with respect to the neutral position, reduce more the allocation rate of the current command value to the motor associated with the ball screw disposed on a side to which the wheel turning shaft moves and increase more the allocation rate of the current command value to the motor associated with the ball screw on a side across from the side to which the wheel turning shaft moves; and the turning apparatus is configured to meet such a condition that, as the wheel turning shaft moves with respect to the neutral position, a value of moment that is applied to the ball screw disposed on the side to which the wheel turning shaft moves increases.

* * * * *